United States Patent Office 3,430,278
Patented Mar. 4, 1969

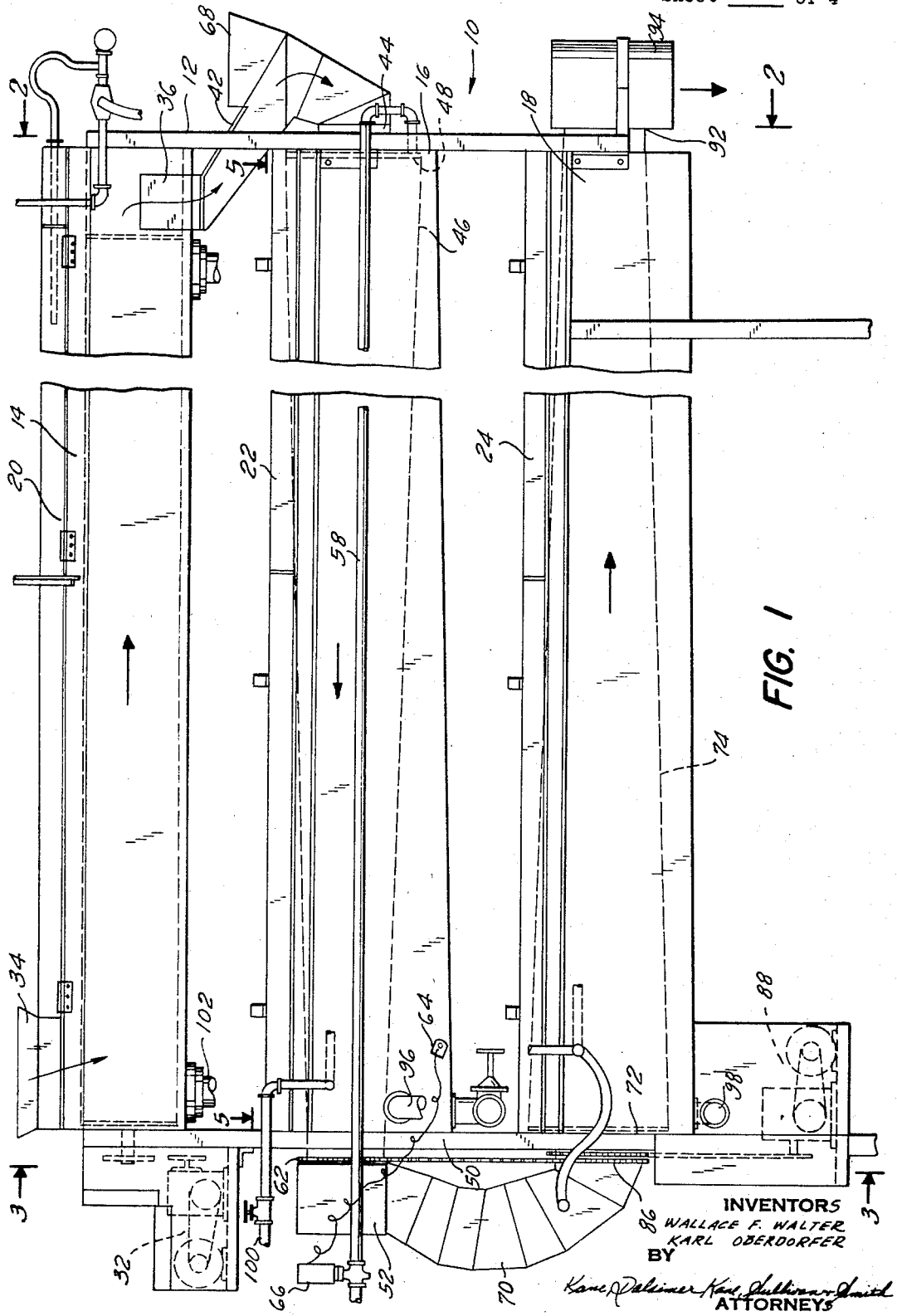
FIG. I

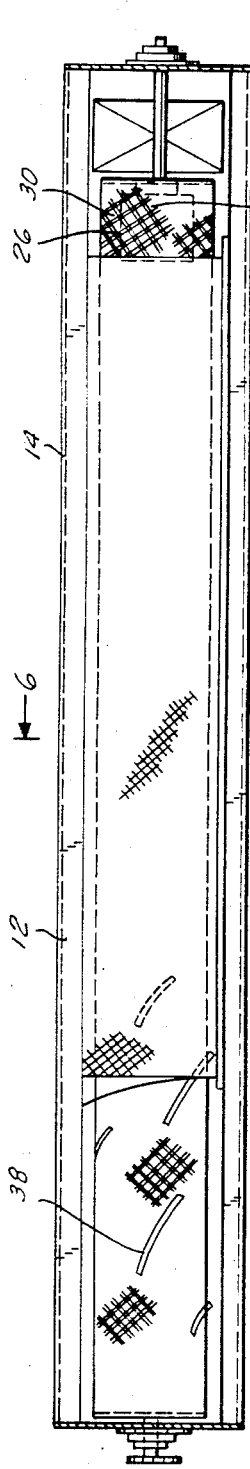
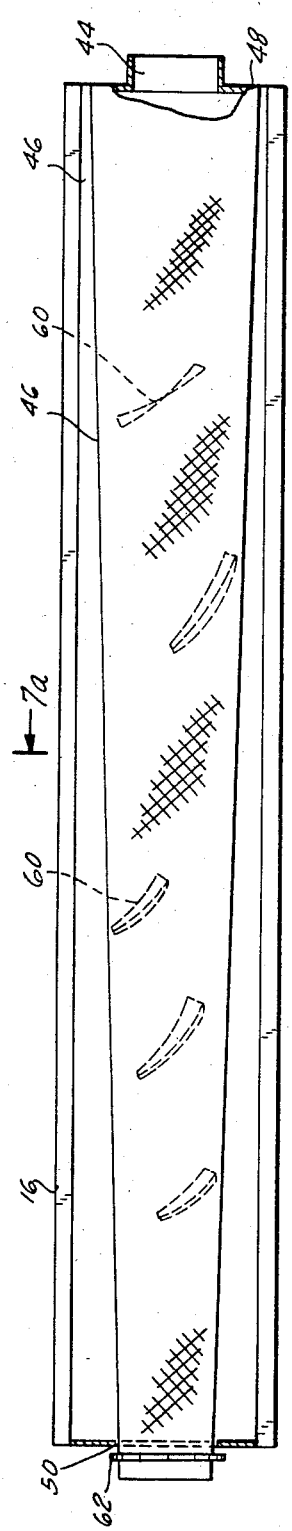
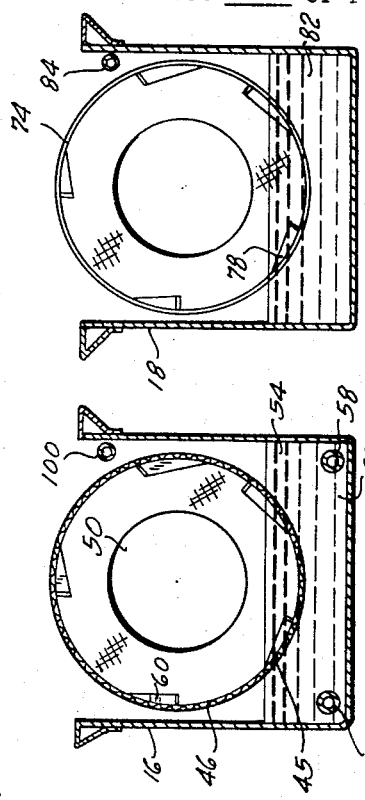
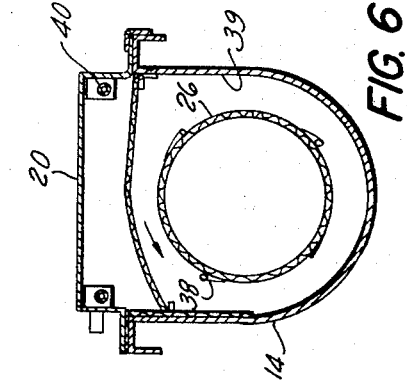
March 4, 1969 W. F. WALTER ET AL 3,430,278
CLEANER FOR MEAT PRODUCTS
Filed Oct. 16, 1967 Sheet 3 of 4
FIG. 4
FIG. 5
FIG. 6
FIG. 7a
FIG. 7b
INVENTORS
WALLACE F. WALTER
KARL OBERDORFER
BY
ATTORNEYS

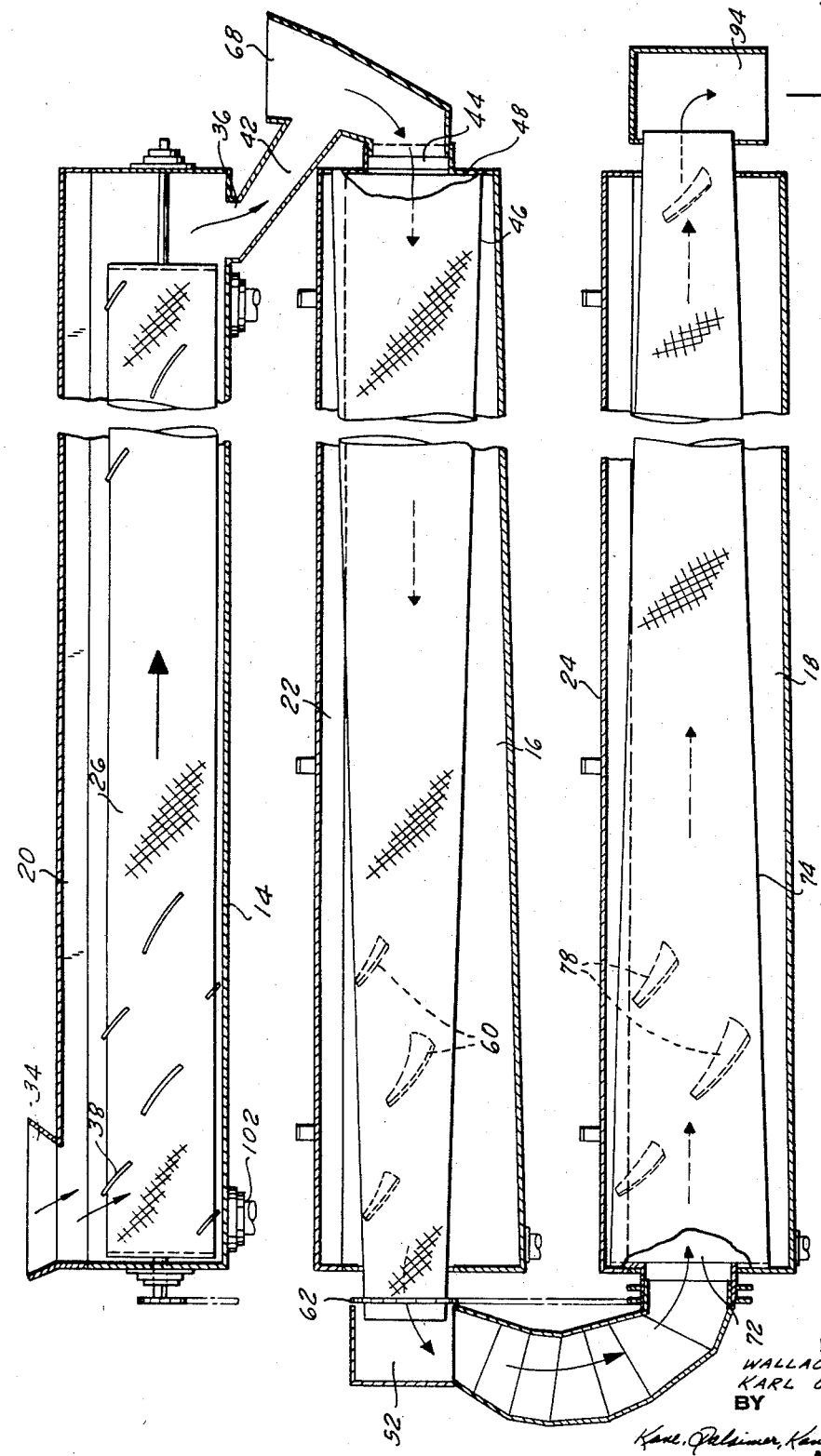

3,430,278
CLEANER FOR MEAT PRODUCTS
Wallace F. Walter, Omaha, Nebr., and Karl Oberdorfer, Council Bluffs, Iowa, assignors to Unexcelled, Inc., a corporation of New York
Filed Oct. 16, 1967, Ser. No. 675,420
U.S. Cl. 15—3.13                  11 Claims
Int. Cl. A22c *17/16, 17/08*

ABSTRACT OF THE DISCLOSURE

A continuous cleaner for meat products such as pork or beef hearts, stomachs, tongues or the like, having a first section that deslimes the material, a second section that scalds the material and a third section that chills the material. The meat products automatically pass from one section to the next and as they pass through any one section they are continuously subjected to the operation performed therein. Bypass means are provided at the head of the scalding section to permit meat products that do not require desliming to enter the cleaning process at the start of the scalding operation after the desliming is completed.

*Background of the disclosure*

Heretofore, the prior art methods of cleaning animal viscera or parts such as pork or beef hearts, stomachs, tongues, etc. have been performed in batch type operations wherein a quantity of such parts were manually placed into a vat, subjected to a cleaning operation such as desliming or scalding, and then manually removed from the vat for further processing. The prior art process has several undesirable drawbacks including the unduly high rate of rejection after cleaning, the necessity that the parts be manually transferred from one processing vat to the next, the relatively small number that can be processed at any given time, and also the various drawbacks inherent in batch operations including the strong possibility that the cleaning of any particular part will not be complete. Further, the prior art methods are time consuming, afford no method of adequately controlling the temperature at which any particular specimen is cleaned and may lead to nonuniform results in that hot or cold spots may develop in the vat in which the process is being carried on. Also, since there is no effective way of draining viscera that has been vat treated, objection has been raised by consumers that "wet product weights" were sold.

*Summary of the invention*

It is therefore the primary object of this invention to provide an apparatus for carrying out the desliming, scalding and chilling of animal parts in a continuous operation wherein each individual part receives substantially uniform treatment.

This and other objects and advantages are most effectively attained by providing an apparatus for cleaning animal viscera which includes a frame having mounted thereon, a plurality of elongated housings. A tubular cleaning member is rotatably mounted within the first housing and includes upstanding abrading edges thereon for scrubbing animal viscera introduced therein. Impeller means are coupled to the cleaning member and are disposed and arranged to longitudinally propel the viscera from one end to the other and to tumble the viscera about during its displacement so that substantially the entire outer surface of the viscera comes in contact with the scrubbing surface and is thereby cleaned or deslimed. The housing also includes a plurality of nozzles directed at the scrubbing surface and capable of providing a constant stream of water on the viscera as it passes, thereby washing off the slime removed during the scrubbing operation.

A second elongated housing is mounted on the frame below the first housing. Transfer means are provided for transferring the viscera from the first housing, after desliming is completed, to the second housing. An entrance port is also provided so that animal parts may be placed directly within the second housing, bypassing the cleaner. The second housing is provided with a trough for containing a supply of scalding fluid through which the viscera is passed and with means for transporting the viscera from the entrance port through the water trough to an exit port distal the entrance.

A third elongated housing is mounted on the frame below the second housing and is provided with a trough which may contain a supply of relatively cool water. This housing is also provided with transporting means for transporting viscera which enters the third housing from an entrance port which is in communication with the exit port of the second housing, through the water trough to an exit port.

The transporting means of the second and third housings comprise perforate tubular conical frustums rotatably mounted internal the respective housings having portions thereon adapted to propel any viscera contained therein longitudinally as the frustum is rotated.

*Description of the drawings*

In the accompanying drawings:

FIG. 1 is a side elevational view of an apparatus for cleaning animal viscera in accordance with the present invention;

FIG. 4 is a top plan view, partly in section of the apparatus in accordance with the present invention;

FIG. 5 is a plan view partly in section along line 5—5 of FIG. 1;

FIG. 6 is a sectional view along line 6—6 of FIG. 4;

FIG. 7a is a sectional view along line 7a—7a of FIG. 5 depicting the second housing;

FIG. 7b is a sectional view similar to FIG. 7a depicting the third housing; and

FIG. 8 is a sectional, side elevational view similar to FIG. 1.

*Description of the preferred embodiment*

Figure 3:
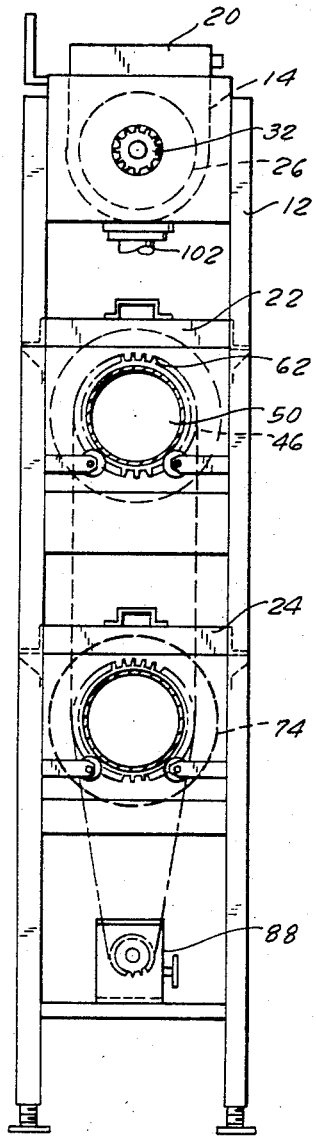
FIG. 3 is a sectional view along line 3—3 of FIG. 1.
Figure 2:
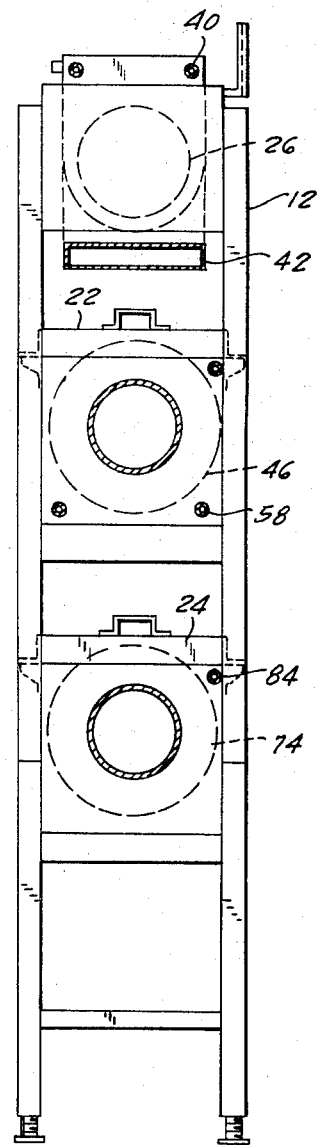
FIG. 2 is a sectional view along line 2—2 of FIG. 1.

Reference is now made to FIG. 1 in particular wherein an apparatus 12 embodying the principles of the present invention is depicted as including a frame 12 supporting a plurality of elongated, generally rectangular housings. In this preferred embodiment, an upper housing 14 is shown along with intermediate and lower housings 16 and 18. Removable covers 20, 22 and 24 are provided for housings 14, 16 and 18 respectively to enable proper cleaning of the apparatus interior.

An elongated, tubular cleaning member 26 is rotatably mounted within the first housing 14. The cleaning member 26 is provided with a plurality of upstanding abrading edges 27 (seen best in FIG. 6) which serve to gently scrape away any material on the outer surfaces of animal viscera in a manner to be described in more detail forthwith. Member 26 may be formed from any suitable material, however, expanded stainless steel has been found most satisfactory. Member 26 consists essentially of a plurality of interconnected ribs 28 diagonally disposed with respect to one another to present substantially diamond-shaped openings 30 between adjacent ribs 28.

Driving means 32 are provided to rotatably drive member 26 with respect to housing 14. An inlet 34 is provided at one end of the housing 14 and an outlet 36 is provided at the opposite end.

Rotating member 26 is provided with a plurality of outwardly extending vanes 38 disposed about the outer surface of the cleaning member 26, at a generally acute angle to the longitudinal axis of member 26. In this preferred embodiment, the vanes 38 comprise segmented portions of spirals wound about the surface of member 26.

The vanes 38 serve to transport any viscera introduced into the housing 14 through the inlet 34 toward the outlet 36. The viscera may be introduced into the inlet 34 manually or automatically by means of an auger, hook or other suitable conveyors. The automatic conveyor is not depicted. Contact with the vanes 38 not only moves the viscera continuously toward outlet 36, but also thoroughly agitates the viscera by physical impact therewith to insure good cleaning as the viscera moves through the housing.

The spacing between the interior walls 39 of the housing 14 and the outer surfaces of the cleaning member 26 is such that the viscera will make light contact with the internal wall surfaces. This gentle rubbing and scrubbing of the viscera as it passes through the housing serves to remove the material, such as mucous membrane and undigested food particles and the like that adhere to the viscera.

The abrading edges of the ribs 28 that define the diamond shaped openings 30 also cooperate in removing any slime from the viscera by gently rubbing and abrading the exposed surfaces. A constant water spray is provided through nozzles 40 to wash the slime away as it is removed from the viscera. Thus, each viscera is subjected to a continuous, individual wash. The nozzles 40 are so directed as to provide a water flow opposite the advance of the viscera. Thus, there is no problem of the viscera being washed with dirty water as it approaches the outlet.

It has been found that if the cleaning is carried on for too long a period, the viscera has a tendency to tear or shred. On the other hand, if the viscera passes through the cleaner too rapidly, incomplete cleaning may result.

In one successful embodiment of the present invention, a rotation rate of 90 r.p.m. coupled with a water spray temperature of between 132° and 142° F. were found to be most effective for cleaning purposes in a 10-foot long housing. The above combination permitted the cleaning of between 600 and 700 pieces per hour and subjected each individual piece to approximately four minutes of cleaning. To assume the proper water temperature, provision may be made for mixing steam and hot water for temperature regulation.

After the viscera has traveled the entire length of the desliming housing 14, it is automatically transported to a second housing wherein the viscera is subjected to scalding hot water to effectively bleach and sterilize the material. For this purpose an inclined chute 42 is provided connecting the outlet 36 of the first housing with an inlet 44 defining an entrance way into the second housing 16. During operation, the viscera will be transported through the first housing 14 in the manner described above to the chute 42 wherein gravity will cause the material to drop into the second housing 16.

The housing 16 is a substantially rectangular elongated tank in which a perforate tubular conical frustum member 46 is rotatably mounted. The cross sectional area of the member 46 decreases from the end 48 proximal the inlet 44 to the end 50 distal the inlet 44 and proximal outlet 52. The inclined chute 42 serves to introduce the viscera to the interior of the tubular member 46. A trough 54 is provided in the lower portion of the housing 16 and serves to contain a supply of scalding water 56. Steam pipes 58 are disposed within the trough and serve to maintain the temperature of the water 56 at the desired temperature. In areas where hard water condition exist, live steam may be introduced directly into the water 56 in order to achieve the proper temperature range.

A multiplicity of vanes 60 are provided along the inner surfaces of the member 46 and serve to constantly tumble the viscera as it passes through the scalding fluid 56. Drive means 62 serve to impart the desired rotation to the member 46. To insure the maintenance of the water temperature within the tolerable limits, temperature sensing means 64 and regulating means 66 are provided within the trough 54 and steam line 58. For the preparation of pork stomachs and tongues, the water temperature should not fall below 150° F. nor exceed 180° F. in order to insure proper sterilizing and bleaching. The scalding operation also serves to firm up the viscera tissue. Further, the viscera should not remain in the water for more than approximately two and a half minutes or cooking will result and hence the speed of rotation should be varied accordingly.

The vanes 60 serve to tumble the viscera as it is longitudinally transported through the member 46. As seen in FIGS. 5 and 7a, the end 50 of the perforate member 46 is entirely above the level of the water 56 while the lower portion 45 of end 48 of the perforate member 46 is emersed below the liquid level, thus the viscera (which is placed within the perforate member 46) will be completely emersed within scalding water when it enters the housing 16 but will gradually be lifted from the liquid and drained through the perforation of member 46 as it approaches outlet 52. The gentle agitation provided by means 60 insure the thorough washing and sterilization of the viscera as it passes through the housing.

Occasionally it may be desirable to blanch or scald certain viscera without subjecting it to a prior desliming operation. This is the case where the viscera consists of hog or beef tongues. For this purpose, the apparatus of the present invention includes a bypass port 68 in communication with the incline chute 42, thus enabling viscera to be introduced directly into the perforate member 46 in the second tank 16 without undergoing prior desliming operations in the upper tank 14.

At the end 50 of the second tank 16 distal the first inclined chute 42 is a second gravity-fed transfer chute 70 connecting the outlet 52 of the second tank 16 with an inlet port 72 on the third and lowest tank 18. The third tank 18 is similar to the second tank 16 with the exception that the perforate tubular conical frustum member 74 of the third tank is disposed opposite that of the second tank so that the wide end 76 of member 74 is in communication with the narrow end 50 of member 46 through the transfer chute 70.

Thus, viscera which drops from within tubular member 46 of the second tank 16 to the interior of tubular member 74 is longitudinally transported along member 74 by the inwardly protruding vanes 78 which are similar to vanes 60 and which comprise segmented portions of a spiral wound about the inner surface of member 74. The vanes also serve to gently agitate the viscera as it moves through tank 18. Tank 18 includes a trough portion 80 in which a supply of cold water 82 is maintained. The water level is maintained by providing a constant supply of water through the water feed pipe 84. In most locales and for most purposes, the temperature of the line water is sufficiently cool to chill the meat after the prior heating operation. However, if required, carbon dioxide or other cooling media can be utilized to further reduce the water temperature.

Rotating means 86 is provided to rotate member 74. In this preferred embodiment, one prime mover 88 is provided for rotating both members 46 and 74 by means of the drive mechanism 90. Three-phase, ¾ horsepower motors have been successfully utilized as both the deslimer driving means 32 and to drive both lower units.

As in the case of the scalding apparatus, the inlet end 76 of member 74 is wider than the end 92 distal the transfer chute 70. Thus, as the viscera passes along the member 74, it will gently and gradually be lifted above the level of water 82 maintained in the trough 80 which comprises the lower portion of tank 18 giving the viscera ample opportunity to properly drain.

A discharge 94 is provided adjacent end 92 of the tubular member 74 to enable the removal of processed viscera from the apparatus. Drain pipes 96 and 98 are provided in the scalding and chilling tanks 16 and 18 respectively and cooperate with the hot water and cold water supply lines 100 and 84 to maintain the desired level of water in tanks 16 and 18 and to enable discarded material to be washed away. A similar drain pipe 102 is located within the desliming tank 14 and serves to enable the removal of slime that is removed from the viscera.

Thus, it can readily be appreciated by one skilled in the art that the apparatus described above will effectively enable the automatic and continuous cleaning of animal viscera.

It should be understood that modifications may be made in the illustrated and described embodiments of our invention without departing from our invention as set forth in the accompanying claims.

We claim:
1. An apparatus for cleaning animal viscera comprising:
   a frame;
   a first elongated housing mounted on said frame including surfaces thereon defining a first opening into the interior thereof at one end and a second opening at the opposite end;
   a cleaning member rotatably mounted within said housing, said member including a plurality of upstanding edges defining abrading surfaces for scrubbing the viscera;
   means for directing viscera introduced through said first opening onto said surface;
   impeller means coupled to said cleaning member disposed and arranged to longitudinally propel the viscera from said first opening to said second opening and to agitate the viscera during its displacement, whereby substantially the entire outer surface of the viscera comes in contact with said abrading surfaces;
   means for driving said cleaning member;
   means for transferring said viscera to a second housing; and,
   a second elongated housing mounted on said frame below said first housing including surfaces thereon defining a first inlet opening into the interior thereof at one end and a second outlet opening at the opposite end;
   said second housing containing means for scalding said viscera and including means for transporting said viscera from said inlet opening to said outlet opening;
   means for transferring said viscera to a third housing; and,
   a third elongated housing mounted on said frame below said second housing including surfaces thereon defining a first inlet opening into the interior thereof at one end and a second outlet opening at the opposite end, said third housing containing means for chilling said viscera and including means for transporting said viscera from said inlet opening to said outlet opening.

2. The apparatus as defined in claim 1 wherein said scalding means comprises a trough designed to contain a supply of scalding water and said transporting means includes a tubular perforate conical frustum member rotatably mounted within said second housing having portions depending within said trough and including a plurality of inwardly extending vanes disposed about the inner surface of said member inclined to the longitudinal axis thereof, said vanes being arranged and disposed to engage the viscera and gently agitate and propel the same from the first opening of said second housing to the second opening as said member is rotated.

3. The apparatus in accordance with claim 2 wherein said vanes comprise a plurality of segmented spirals wound about the inner surface of said member.

4. The apparatus as defined in claim 2 wherein said rotatably mounted member is tapered so that the cross sectional area decreases as said second opening is approached and the smaller end of said member is completely above said trough so as to enable said member to gradually lift the viscera from the trough as the viscera is moved in the direction of the second opening.

5. The invention in accordance with claim 1 wherein the transfer means to the second housing comprises an inclined tubular member communicating with and connecting the second opening of said first housing and the first opening of said second housing including portion thereon defining an opening into the interior thereof whereby viscera may be admitted directly into said second housing bypassing said first housing.

6. The apparatus as described in claim 1 further comprising heating means in communication with the interior of said trough capable of maintaining the temperature of water within the trough at scaling temperature.

7. The invention in accordance with claim 6 wherein said heating means comprises at least one steam carrying pipe having portions disposed within said trough, valve means coupled to said pipe capable of controlling the flow of steam therein, and valve control means coupled to said valve means and to temperature sensing means in communication with the interior of said trough and sensitive to fluctuation in temperature within said trough.

8. The apparatus as defined in claim 1 wherein said chilling means comprises a trough designed to contain a supply of relatively cold water and said transporting means includes a tubular perforate conical frustum member rotatably mounted in the said third housing having portions depending within said trough and including a plurality of inwardly extending vanes disposed about the inner surface of said member inclined to the longitudinal axis thereof, said vanes being arranged and disposed to engage the viscera and gently agitate the same from the first opening of said third housing to the second opening as said member is rotated.

9. The apparatus in accordance with claim 8 wherein said vanes comprise a plurality of segmented spirals wound about the inner surface of said member.

10. The apparatus as defined in claim 8 wherein said rotatably mounted member is tapered so that the cross sectional area decreases as said second opening is approached and the smaller end of said member is completely above said trough so as to enable said member to gradually lift the viscera from the trough as the viscera is moved in the direction of the second opening.

11. The apparatus as described in claim 8 further comprising cooling means in communication with the interior of said trough capable of maintaining the temperature of water contained therein at a predetermined desired level.

References Cited

UNITED STATES PATENTS

| | | | |
|---|---|---|---|
| 1,925,362 | 9/1933 | Anstiss. | |
| 2,119,311 | 5/1938 | Biedermann | 51—164 X |
| 2,390,011 | 11/1945 | Thompson | 51—164 |
| 3,321,788 | 5/1967 | Himebaugh | 15—3.16 |
| 3,393,413 | 7/1968 | Walter | 15—3.13 |

EDWARD L. ROBERTS, *Primary Examiner.*

U.S. Cl. X.R.

17—43